US011933487B2

(12) United States Patent
Van Bommel et al.

(10) Patent No.: US 11,933,487 B2
(45) Date of Patent: Mar. 19, 2024

(54) LIGHTING DEVICE

(71) Applicant: SIGNIFY HOLDING B.V., Eindhoven (NL)

(72) Inventors: Ties Van Bommel, Horst (NL); Rifat Ata Mustafa Hikmet, Eindhoven (NL); Johannes Petrus Maria Ansems, Hulsel (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/785,121

(22) PCT Filed: Dec. 15, 2020

(86) PCT No.: PCT/EP2020/086300

§ 371 (c)(1),
(2) Date: Jun. 14, 2022

(87) PCT Pub. No.: WO2021/136656

PCT Pub. Date: Jul. 8, 2021

(65) Prior Publication Data

US 2022/0381420 A1 Dec. 1, 2022

(30) Foreign Application Priority Data

Jan. 2, 2020 (EP) .................................... 20150036

(51) Int. Cl.
*F21V 7/00* (2006.01)
*F21K 9/232* (2016.01)
(Continued)

(52) U.S. Cl.
CPC ............ *F21V 7/0083* (2013.01); *F21K 9/232* (2016.08); *F21K 9/62* (2016.08); *F21V 23/003* (2013.01); *F21Y 2115/10* (2016.08)

(58) Field of Classification Search
CPC ........ F21V 7/0083; F21V 23/003; F21K 9/62; F21K 9/232
See application file for complete search history.

(56) References Cited

U.S. PATENT DOCUMENTS 7,922,355 B1 4/2011 Morejon et al.
10,962,176 B2 * 3/2021 Liu ........................ F21V 13/04
(Continued)

FOREIGN PATENT DOCUMENTS

CN 102269385 A 12/2011
WO 2019016217 A1 1/2019
WO 2019078351 A1 4/2019

*Primary Examiner* — Bryon T Gyllstrom

(57) ABSTRACT

A lighting device (100), comprising a plurality of light sources (110), a cover (120) comprising an at least partially light-transmissive material, wherein the cover at least partially encloses the plurality of light sources, and a plurality of reflectors (130) arranged within the cover and at respective peripheral portions of the cover, wherein a first set of light sources (140) is arranged within the plurality of reflectors such that the light sources within each reflector is configured to emit a respective bundle of light from the lighting device, and wherein a second set of light sources (150) is arranged outside the plurality of reflectors and configured to emit light from the lighting device, wherein the lighting device further comprises a control unit (160) configured to individually control the operation of the first and second sets of light sources.

13 Claims, 3 Drawing Sheets

(51) Int. Cl.

| | |
|---|---|
| ***F21K 9/62*** | (2016.01) |
| ***F21V 23/00*** | (2015.01) |
| ***F21Y 115/10*** | (2016.01) |

(56) References Cited

U.S. PATENT DOCUMENTS

| | | | | |
|---|---|---|---|---|
| 2010/0134016 | A1 | 6/2010 | York et al. | |
| 2010/0172120 | A1 | 7/2010 | Wegh et al. | |
| 2011/0089830 | A1* | 4/2011 | Pickard | F21V 29/74 315/32 |
| 2011/0215696 | A1* | 9/2011 | Tong | F21V 3/04 313/46 |
| 2012/0300453 | A1* | 11/2012 | Zhou | F21K 9/61 362/235 |
| 2013/0027928 | A1 | 1/2013 | Kang et al. | |
| 2013/0093362 | A1 | 4/2013 | Edwards | |
| 2013/0214666 | A1* | 8/2013 | Leung | F21K 9/68 313/111 |
| 2013/0279164 | A1* | 10/2013 | Hsu | F21S 4/28 362/249.02 |
| 2014/0036497 | A1* | 2/2014 | Hussell | F21V 29/77 362/235 |
| 2015/0156884 | A1 | 6/2015 | Gielen | |
| 2015/0267896 | A1* | 9/2015 | Moon | F21V 7/0016 362/310 |
| 2016/0312965 | A1 | 10/2016 | Hikmet et al. | |
| 2017/0138553 | A1 | 5/2017 | Ferrari et al. | |

* cited by examiner

LIGHTING DEVICE

CROSS-REFERENCE TO PRIOR APPLICATIONS

This application is the U.S. National Phase application under 35 U.S.C. § 371 of International Application No. PCT/EP2020/086300, filed on Dec. 15, 2020, which claims the benefit of European Patent Application No. 20150036.0, filed on Jan. 2, 2020. These applications are hereby incorporated by reference herein.

FIELD OF THE INVENTION

The present invention generally relates to lighting devices, e.g. comprising one or more light emitting diodes (LEDs). More specifically, the lighting devices are arranged to provide a decorative lighting while at the same time being able to provide a dynamic shadowing and to reduce glare during operation.

BACKGROUND OF THE INVENTION

The use of light emitting diodes (LEDs) for illumination purposes continues to attract attention. Compared to incandescent lamps, fluorescent lamps, neon tube lamps, etc., LEDs provide numerous advantages such as a longer operational life, a reduced power consumption, and an increased efficiency related to the ratio between light energy and heat energy.

It is of interest to have lighting devices and/or arrangements (such as lamps) which are able to produce decorative (white) light and induce improved and/or new dynamic shadows while being able to reduce glare. In the prior art, there are numerous examples of lighting devices which are intended to produce decorative light. However, these lighting devices are often unable to provide a dynamic shadowing of the light emitted therefrom. Furthermore, the lighting devices are often unable to reduce glare in a satisfactory manner.

Hence, it is an object of the present invention to provide alternatives to existing lamps of the prior art in order to obtain a more decorative lighting while at the same time providing a dynamic shadowing and reducing glare.

SUMMARY OF THE INVENTION

Hence, it is of interest to overcome at least some of the deficiencies of the present lamps of the prior art in order to provide a lighting device which may achieve a decorative lighting while at the same time being able to provide a dynamic shadowing of the light emitted therefrom and to reduce glare of during operation.

This and other objects are achieved by providing a lighting device having the features in the independent claim. Preferred embodiments are defined in the dependent claims.

Hence, according to the present invention, there is provided a lighting device comprising a plurality of light sources. The lighting device further comprises a cover comprising an at least partially light-transmissive material, wherein the cover at least partially encloses the plurality of light sources. The lighting device further comprises a plurality of reflectors arranged within the cover and at respective peripheral portions of the cover. A first set of light sources is arranged within the plurality of reflectors such that the light sources within each reflector is configured to emit a respective bundle of light from the lighting device. A second set of light sources is arranged outside the plurality of reflectors and is configured to emit light from the lighting device. The lighting device further comprises a control unit configured to individually control the operation of the first and second sets of light sources.

Thus, the present invention is based on the idea of a lighting device comprising at least two sets of light sources being individually controllable. The first set of light sources is arranged within the plurality of reflectors such that the light emitted from the first set of light sources during operation of the lighting device is directed towards a (discrete) portion of the exit surface of the cover of the lighting device. The second set of light sources is arranged outside the plurality of reflectors such that the light emitted from the second set of light sources during operation of the lighting device exits the lighting device by the mixing chamber as defined by the cover of the lighting device. By this configuration, the lighting device may hereby provide a dynamic shadow effect of the light emitted from the lighting device, wherein the sharpness of the shadows may be controlled by the control unit. By controlling (adjusting) the intensity of the first and second sets of light sources via the control unit, the lighting device of the present invention may provide a decorative lighting while at the same time providing a dynamic shadowing and a reduced glare.

The present invention is hereby advantageous in that the lighting device may obtain an aesthetically appealing lighting effect, while glare may be at least partially reduced, or even eliminated, by the innovative concept of the lighting device.

It will be appreciated that the lighting device of the present invention furthermore comprises relatively few components. The relatively low number of components is advantageous in that the lighting device is relatively inexpensive to fabricate. Moreover, the relatively low number of components of the lighting device implies an easier recycling, especially compared to devices or arrangements comprising a relatively high number of components which impede an easy disassembling and/or recycling operation.

The lighting device comprises a plurality of light sources. The plurality of light sources is preferably light emitting diodes, LEDs. The lighting device further comprises a cover comprising an at least partially light-transmissive material, wherein the cover at least partially encloses the plurality of light sources. By the term "cover", it is here meant an enclosing element, such as a cap, cover, envelope, or the like, comprising an at least partial light-transmissive material, e.g. a translucent and/or transparent material.

The cover defines a mixing chamber for at least a portion of the light emitted from the plurality of light sources during operation. By the term "mixing chamber", it is here meant a space wherein light may be reflected before exiting the mixing chamber.

The lighting device further comprises a plurality of reflectors arranged within the cover and at respective peripheral portions of the cover. A first set of light sources is arranged within the plurality of reflectors such that the light sources within each reflector is configured to emit a respective bundle of light from the lighting device. A second set of light sources is arranged outside the plurality of reflectors and is configured to emit light from the lighting device. Hence, the light emitted from the second set of light sources is mixed in the mixing chamber defined by the cover of the lighting device, whereas the light emitted from the first set of light sources is emitted, at least partially via the plurality of reflectors, as bundles of light.

The lighting device further comprises a control unit configured to individually control the operation of the first and second sets of light sources. By "control unit", it is here meant substantially any unit, device, arrangement, or the like, which is coupled or connected to the first and second sets of light sources in order to control the first and second sets of light sources, respectively. By the term "control the first and second sets of light sources", it may here be meant that the control unit is configured to control the intensity of the light emitted from the first and second sets of light sources.

According to an embodiment of the present invention, the control unit may be configured to vary the luminous flux of the light emitted from at least one of the first and second set of light sources. It will be appreciated that the ratio between the luminous flux of the light emitted from the first set of light sources and second set of light sources may change as function of time. The present embodiment is advantageous in that an even more decorative lighting and dynamic shadowing of the light emitted from the plurality of light sources may be obtained.

According to an embodiment of the present invention, the control unit may be configured to maintain the total luminous flux of the light emitted from the first and second set of light sources constant as a function of time. In other words, the control unit may be configured to maintain or keep the total luminous flux of the light emitted from the first and second set of light sources within a (relatively small) predetermined interval as a function of time. For example, the control unit may be configured to vary the luminous flux of the light emitted from the first and second set of light sources individually, albeit the total luminous flux is held constant as a function of time.

According to an embodiment of the present invention, the cover may comprise a plurality of first portions respectively arranged in front of each reflector of the plurality of reflectors, and a second portion of the cover separate from the plurality of first portions, wherein at least one property of the plurality of first portions comprises is different from at least one property of the second portion. In other words, the plurality of first portions may comprise at least one property (e.g. a physical, mechanical and/or optical property) which is different from at least one property (e.g. a physical, mechanical and/or optical property) of the second portion. For example, and according to an embodiment, a surface area of the plurality of first portions may be at least two times smaller than a surface area of the second portion, the plurality of first portions may have a lower reflectance than the second portion, and/or a maximum intensity at the first portions may be at least twice as high as a maximum intensity at the second portion of the light emitted from the plurality of light sources during operation. The obtained effect of this embodiment is an improved decorative lighting while at the same time providing a dynamic shadowing and reducing glare. The plurality of first portions may have the same shape, whereby the obtained effect encompasses improved shadows during operation of the lighting device. The reason is that the lighting device may provide the same type of shadows in each direction of the lighting device, e.g. in case a homogeneous mask/shadowing means is applied. Furthermore, the plurality of first portions may have different shapes, e.g. a shape selected from the group consisting of a circle, an oval, a square, and a polygon shape (e.g. a pentagon shape, a hexagon shape, or a heptagon shape). Moreover, the plurality of first portions may have a shape having a longest diameter and a shortest diameter, wherein the ratio between the longest diameter and the shortest diameter is in the range of 0.8-1.2. The obtained effect of this embodiment is an improved shadowing effect, as these shapes have a substantially constant diameter in all directions.

According to an embodiment of the present invention, the first set of light sources may be configured to provide light having a first color temperature, $CT_1$, and the second set of light sources may be configured to provide light having a second color temperature, $CT_2$. The difference in color temperature between the first and second color temperatures may be at least 300 K, more preferably at least 500 K, and most preferred at least 700 K. By this features, different color temperatures can be generated, e.g. in that the lighting device may provide shadows and/or a background illumination. Hence, the present embodiment is advantageous in that an improved decorative lighting may be obtained. Furthermore, the difference in color temperature between the first and second color temperatures may be less than 1200 K, more preferably less than 1100 K, and most preferred less than 1000 K. The present embodiment is advantageous in that a relatively small difference in color temperatures results in an aesthetically desirable light, which in turn results in an improved decorative lighting.

According to an embodiment of the present invention, the first color temperature and the second color temperature may be the same. The present embodiment is advantageous in that the light emitted from the lighting device during operation may have a uniform color temperature, resulting in a homogeneous lighting.

Furthermore, the first color temperature and the second color temperature may be in the range of 1800-5000 K, more preferably in a range of 1900-4000 K, and even more preferred in a range of 2000-3500 K. The first color temperature and the second color temperature may have a color rendering index of at least 80.

According to an embodiment of the present invention, the plurality of reflectors and the first set of light sources may be arranged within the lighting device such that the bundles of light emitted from the lighting device during operation have an overlap which is less than 30%, preferably less than 25%, and even more preferred less than 20%. The present embodiment is advantageous in that the overlap of the light emitted from the first set of light sources is relatively small, thereby enhancing the shadow quality.

According to an embodiment of the present invention, the plurality of reflectors and the first set of light sources may be arranged within the lighting device such that the bundles of light emitted from the lighting device during operation have an overlap which is more than 1%, preferably more than 3%, and even more preferred more than 5%. The present embodiment is advantageous in that a minimum overlap of 1%, preferably 3%, and even more preferred 5%, may create even more homogenous color shadows of the light emitted from the lighting device.

According to an embodiment of the present invention, the reflectors of the plurality of reflectors may be arranged equidistantly along the periphery of the cover. The present embodiment is advantageous in that the symmetric arrangement of the plurality of reflectors of the lighting device contributes to the aesthetic appearance of the lighting device as such. Furthermore, the symmetric arrangement of the plurality of reflectors contributes to a symmetric emission of light from the lighting device, which further enhances the decorative aspect of the emitted light.

According to an embodiment of the present invention, the reflectors of the plurality of reflectors may be arranged along the periphery of the cover and may be separated by an angle of at least 20°, more preferably at least 25°, and even more preferred at least 30°.

According to an embodiment of the present invention, the number of reflectors may be in the range of 2-5, more preferably 3 or 4, and even more preferred 3.

According to an embodiment of the present invention, the cover may comprise a plurality of apertures, and wherein each aperture is arranged to let through a respective bundle of light from the lighting device. The present embodiment is advantageous in that the lighting device may produce shadows, wherein the sharpness of the shadows may be controlled by the control unit, controlling the light intensity from the first and second sets of light sources, respectively. In case the control unit controls the light intensity of the first and second sets of light sources such that the intensity of the light emitted from the first set of light sources is set at a relatively high level, or even at a maximum level, and the intensity of the light from the second set of light sources is set at a relatively low level, at a minimum level, or in an off state, the lighting device is able to provide sharp shadows. The present embodiment is further advantageous in that the control unit may be configured to adjust the intensity of the light emitted from the first and second set of light sources such that the shadow contrast is adjusted.

According to an embodiment of the present invention, the plurality of apertures may be arranged equidistantly in a circumferential direction of the cover, and wherein the length between pair of apertures is at least 5 mm, more preferably at least 8 mm, and even more preferred at least 10 mm. The present embodiment is advantageous in that the symmetric arrangement of the plurality of apertures of the lighting device contributes to the aesthetic appearance of the lighting device as such, as well as the light emitted therefrom. The present embodiment is further advantageous in that the (color) shadow effect of the light from the lighting device during operation may be improved even further.

According to an embodiment of the present invention, at least one reflector of the plurality of reflectors may be at least partially reflective.

According to an embodiment of the present invention, at least one reflector of the plurality of reflectors may comprise an at least partially reflective layer.

According to an embodiment of the present invention, at least one reflector may have a reflectance of >80%, more preferably >85%, and even more preferred >90%. The present embodiment is advantageous in that the reflectance as exemplified provides light beams with improved shadowing properties and an improved decorative lighting of the lighting device, as a major part of the light emitted from the lighting device during operation is emitted from the first set of light sources and via the reflectors. It will be appreciated that there may also be a difference between the reflectance of the at least one reflector with respect to a reflectance of the cover. For example, the difference may be at least 30%. It will be appreciated that a relatively low reflectance of the reflector(s) provides improved bundles of light from the first set of light sources with respect to the shadowing effect of the emitted light.

According to an embodiment of the present invention, the cover may have a reflectance in the range of 20-70%, more preferably 25-60%, and even more preferred 30-50%. For example, the cover may constitute a semi-reflective light exit window. The obtained effect of this embodiment is a homogeneous lighting and efficiency of the lighting device. It will be appreciated that a relatively high reflectance of the cover leads to a relatively high mixing of the light in the mixing chamber of the lighting device.

According to an embodiment of the present invention, the cover may be bulb-shaped and may elongate along an axis, A, and wherein at least two reflectors of the plurality of reflectors are arranged in a plane, B, perpendicular to the axis, A.

According to an embodiment of the present invention, the cover may have an absorption less than 7%, more preferably less than 5%, most preferred less than 3%, such as 1% or even <1% during operation of the lighting device. The present embodiment is advantageous in that there is a relatively high efficiency of the mixing in the mixing chamber of the lighting device.

According to an embodiment of the present invention, the cover may be bulb-shaped and may elongate along an axis, A, and wherein at least one reflector of the plurality of reflectors is arranged at an end portion of the cover.

According to an embodiment of the present invention, the light sources of the plurality of light sources are light emitting diodes, LEDs.

According to an embodiment of the present invention, there is provided a lighting arrangement elongating along a principal axis, A. The lighting arrangement comprises a lighting device according to any one of the preceding embodiments, wherein the lighting device is arranged at a first end portion of the lighting arrangement. The lighting arrangement further comprises an electrical connection connected to the lighting device for a supply of current to the plurality of light sources, wherein the electrical connection is arranged at a second end portion, opposite the first end portion, of the lighting arrangement. The present embodiment is advantageous in that the lighting device according to the invention may be conveniently arranged in substantially any lighting arrangement, such as a LED lamp, luminaire, lighting system, or the like.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1B:
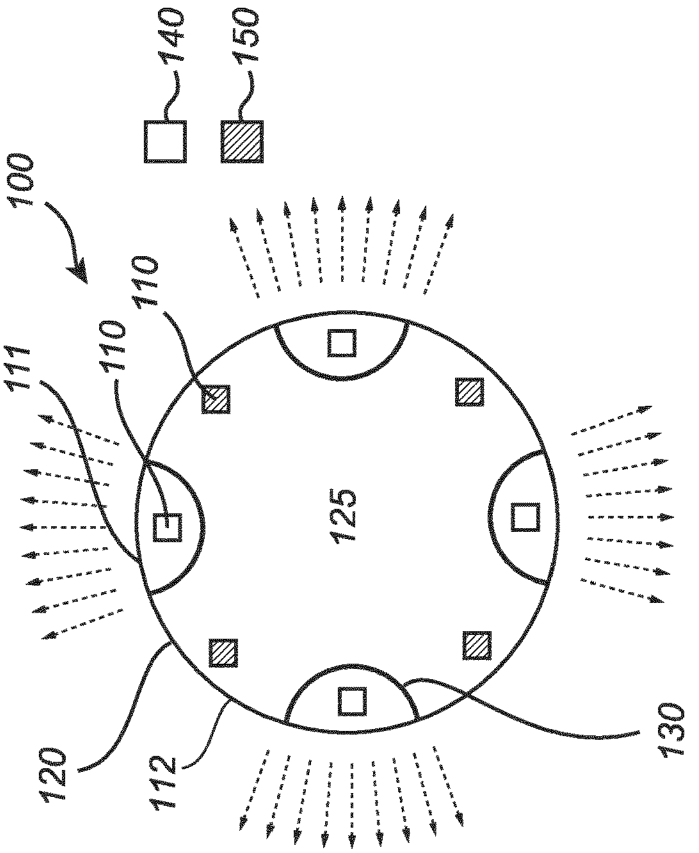
FIGS. 1*a* and 1*b* schematically show cross-sections of a lighting device according to an exemplifying embodiment of the present invention.
Figure 1A:
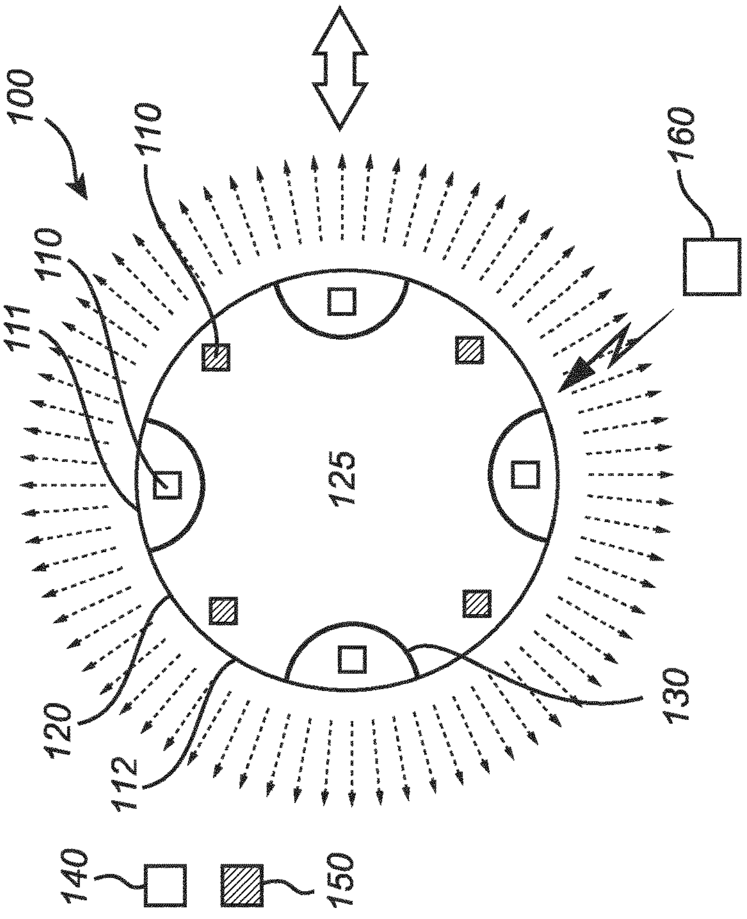

FIG. 1*a* schematically shows a cross-section of a lighting device 100 according to an exemplifying embodiment of the present invention. More specifically, FIG. 1 shows a cross-section of a cover 120 of the lighting device 100, wherein the cover 120 at least partially encloses a plurality of light sources 110. It will be appreciated that the cross-section of the cover 120 may not necessarily be circular, but may take on substantially any shape. The cover 120 comprises an at least partially light-transmissive material. The cover 120 may be a diffuser, i.e. the cover 120 may be configured to diffuse and/or scatter the light emitted from the plurality of light sources 110 during operation of the lighting device 100. The plurality of light sources 110 are divided into a first set of light sources 140 and a second set of light sources 150. It will be appreciated that the light sources (e.g. LEDs) of the first and second sets of light sources 140, 150 may be of the same kind or type. The lighting device 100 comprises a plurality of reflectors 130, schematically indicated as arches, and arranged within the cover 120. The reflectors 130 are arranged at respective peripheral portions of the cover 120. Each light source 110 of the first set of light sources 140 is arranged within a respective reflector 130. In this way, each light source 110 of the first set of light sources 140, arranged within a respective reflector 130, is configured to emit a respective bundle of light from the lighting device 100 during operation thereof.

The second set of light sources 150 of the lighting device 100 is arranged outside the plurality of reflectors 130, and the light sources 110 of the second set of light sources 150 are arranged at respective peripheral portions of the cover 120. In the exemplifying configuration of the lighting device 100 in FIG. 1*a*, light sources 110 of the first and second set of light sources 140, 150 are arranged in an alternating manner at the periphery of the cover 120. The lighting device 100 as exemplified comprises four light sources 110 of the first set of light sources 140 and four light sources 110 of the second set of light sources 150. The number of light sources 110 of the first set of light sources 140 (and the number of reflectors 130, respectively), may preferably be in the range of 2-5, more preferably 3 or 4, and even more preferred 3. It should be noted, however, that the number of light sources 110 of the first and second sets of light sources 140, 150 may be chosen arbitrarily. The second set of light sources 150 of the plurality of light sources 110, which is arranged outside the plurality of reflectors 130 and within the mixing chamber of the cover 120, is configured to emit light from the lighting device 100.

The lighting device 100 in FIG. 1*a* further comprises a control unit 160. Here, the control unit 160 is only schematically indicated, and is connected to the plurality of light sources 110 of the lighting device 100 either via wire or by wireless technology. It will be appreciated that the control unit 160 may be integrated within the lighting device 100. The control unit 160 is configured to individually control the operation of the light sources 110 of the first and second sets of light sources 140, 150. As exemplified in FIG. 1*a*, the control unit 160 may control the first and second sets of light sources 140, 150 such that the intensity of the light emitted from the first set of light sources 140 is the same as the intensity of the light emitted from the second set of light sources 150. Hence, the control unit 160 may hereby control the light sources 110 of the first and second sets of light sources 140, 150 such that the intensity of the light emitted from the lighting device 100 is substantially constant in an omnidirectional direction of the lighting device 100.

The first set of light sources 140 may be configured to provide light having a first color temperature, $CT_1$, and the second set of light sources 150 may be configured to provide light having a second color temperature, $CT_2$. The difference in color temperature between the first and second color temperatures may be 300-1200 K, more preferably 500-1100 K, and most preferred 700-1000 K. It will be appreciated that the first and second color temperatures 140, 150 may be the same. Furthermore, the first and second color temperatures 140, 150 may be in the range of 1800-5000 K, more preferably in a range of 1900-4000 K, and even more preferred in a range of 2000-3500 K. The first and second color temperatures 140, 150 may have a color rendering index of at least 80.

The reflectors 130 may have a reflectance of >80%, more preferably >85%, and even more preferred 90%. The cover 120 may have a reflectance in the range of 20-70%, more preferably 25-60%, and even more preferred 30-50%. Furthermore, the cover 120 may have an absorption which is less than 3%, such as 1% or even <1% during operation of the lighting device 100.

FIG. 1*b* schematically shows the same cross-section of the lighting device 100 as shown in FIG. 1*a*, and it is hereby referred to FIG. 1*a* for an increased understanding of the arrangement and functionality of the lighting device 100. In FIG. 1*b*, the control unit 160 controls the light sources 110 of the first and second sets of light sources 140, 150 such that the intensity of the light emitted from the first set of light sources 140 is higher than the intensity of the light emitted from the second set of light sources 150. For example, the control unit 160 may turn off the second set of light sources 150. FIG. 1*b* clearly discloses the emission of the respective bundles of light from each light source 110 of the first set of light sources 140, arranged within a respective reflector 130, of the lighting device 100 during operation thereof.

In FIGS. 1*a* and 1*b*, the plurality of reflectors 130 and the first set of light sources 140 are arranged within the lighting device 100 equidistantly and at the periphery of the cover 120. By this arrangement, and as indicated in FIG. 1*b*, the bundles of light emitted from the first set of light sources 140 of the lighting device 100 during operation have no overlap. For the possible configurations of the first and/or second sets of light sources 140, 150 in the lighting device 100, it is preferred that the overlap of the bundles of light emitted from the first and second sets of light sources 140, 150 is less than 30%, preferably less than 25%, and even more preferred less than 20%. Furthermore, the reflectors of the plurality of reflectors 130 are separated by an angle of 90° according to the embodiment of the lighting device 100 of FIGS. 1*a* and 1*b*. It will be appreciated that the plurality of reflectors 130 may be separated by an angle of at least 20°, preferably at least 25°, and even more preferred at least 30°, with respect to a center portion of the cover.

It will be appreciated that the control unit 160 of the lighting device 100 may control the light emitted from the light sources 110 of the first and second sets of light sources 140, 150 from the example of FIG. 1*a* to the example of FIG. 1*b*. In other words, the control unit 160 may be configured to keep and/or increase the intensity of the light from the light sources 110 of the first set of light sources 140, and to dim and/or to turn off the light sources 110 of the second set of light sources 150. In this change of the intensity of the light emitted from the first and second sets of light sources 140, 150 of the lighting device 100 as exemplified from FIG. 1*a* to FIG. 1*b*, the control unit 160 may still be configured to maintain the total luminous flux of the light emitted from the first and second set of light sources 140, 150 as a function of time.

In FIGS. 1*a* and 1*b*, the cover 120 of the lighting device 100 comprises a plurality of first portions 111 respectively arranged in front of each reflector of the plurality of reflectors 130. The cover 120 further comprises a second portion 112 of the cover 120 which is separate from the plurality of first portions 111 of the cover 120. The relative properties between the plurality of first portions 111 and the second portion 112 of the cover 120 may fulfill one or more of the following: for example, a surface area of the plurality of first portions 111 of the cover 120 may be at least two times smaller than a surface area of the second portion 112 of the cover 120. Furthermore, the plurality of first portions 111 of the cover 120 may have a lower reflectance than the second portion 112 of the cover 120. According to another example, a maximum intensity of the light emitted from the plurality of light sources 110 during operation at the plurality of first portions 111 may be at least two times higher than a maximum intensity at the second portion 112 of the light emitted from the plurality of light sources 110 during operation.

Figure 2:
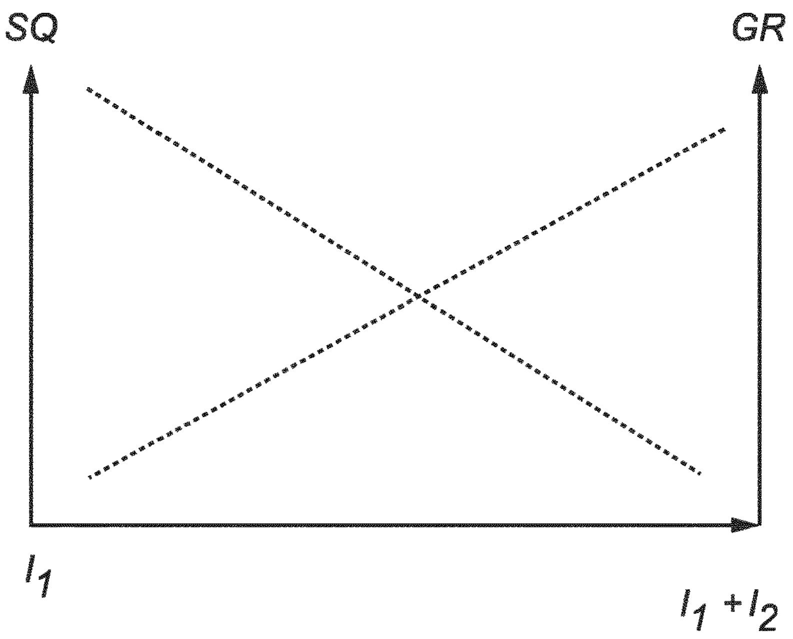
FIG. 2 shows a schematic diagram of the shadow quality and glare reduction as a function of the intensity of the light emitted from the first and second sets of light sources.

FIG. 2 shows a schematic diagram of the shadow quality, SQ, and glare reduction, GR, of the light emitted from the lighting device of the present invention as a function of the intensity of the light emitted from the first set of light sources, $I_1$, and the intensity of the light emitted from the first and second sets of light sources, $I_1+I_2$, controlled by the control unit. At the left hand portion of FIG. 3, the control unit controls the light intensity of the first and second sets of light sources by operating the first set of light sources, i.e. with a relatively high (or maximum) level of $I_1$, while setting the intensity of the light emitted from the second set of light sources, $I_2$, at a relatively low level, a minimum level, or even at an off state. Hence, the light emitted from the lighting device during operation at the left hand portion of FIG. 2 is substantially, or completely, emitted from the first set of light sources. At this setting by the control unit, the shadow quality, SQ, of the light emitted from the lighting device, is at a relatively high level, or even at a maximum level, whereas the glare reduction, GR, is at a relatively low level, or even at a minimum level.

At the right hand portion of FIG. 2, the control unit controls the light intensity of the first and second sets of light sources by operating the first set of light sources, i.e. with a relatively high (or maximum) level of $I_1$, while setting the intensity of the light emitted from the second set of light sources, $I_2$, at a relatively high level, or even at maximum level. For example, the control unit may be configured to set the intensity of the light emitted from the first and second sets of light sources at the same level. At this setting by the control unit, the shadow quality, SQ, of the light emitted from the lighting device, is at a relatively low level, or even at a minimum level, whereas the glare reduction, GR, is at a relatively high level, or even at a maximum level.

Figure 3A:
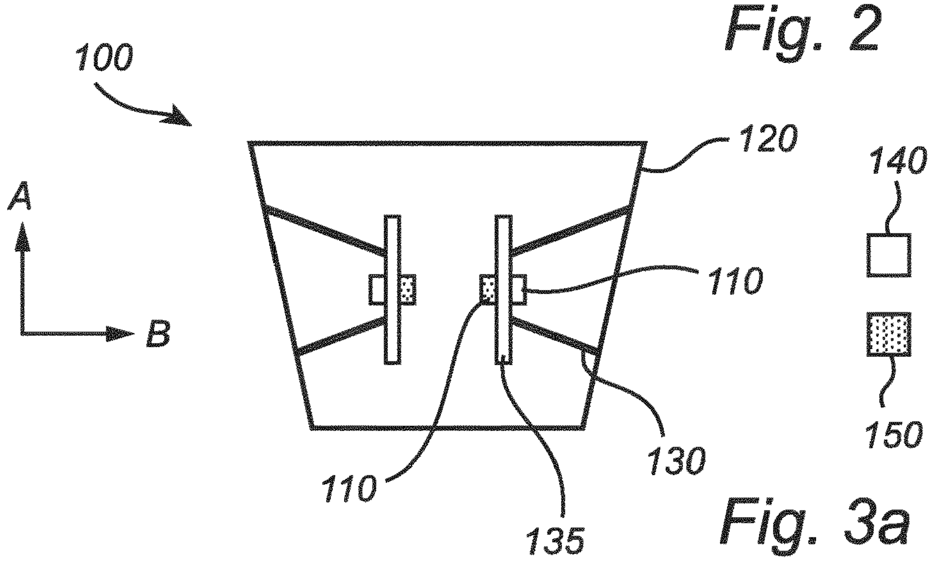
FIGS. 3*a* and 3*b* schematically show cross-sections of a lighting device according to an exemplifying embodiment of the present invention, FIGS. 4*a*, 4*b* and 4*c* schematically shows light distribution patterns from the lighting device according to an exemplifying embodiment of the present invention.
Figure 3B:
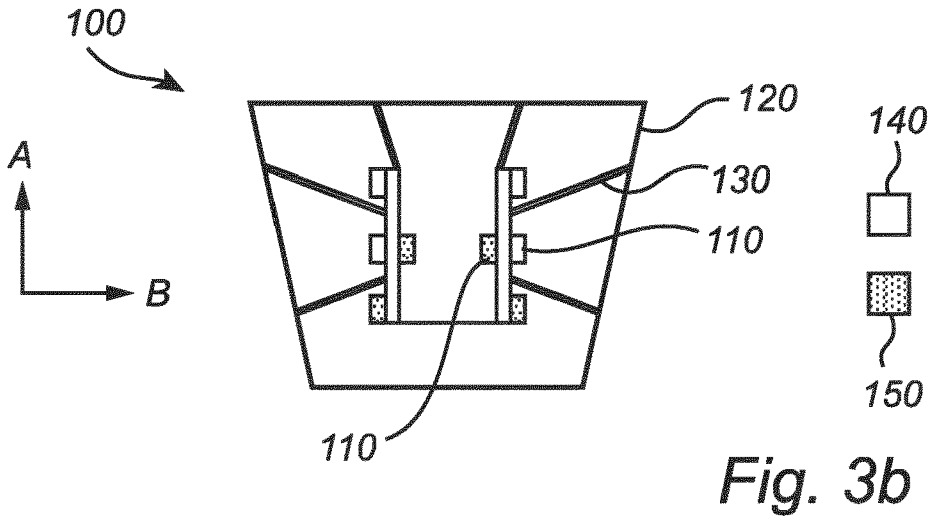

FIGS. 3*a* and 3*b* schematically show cross-sections of a lighting device 100 according to an exemplifying embodiment of the present invention. In FIG. 3*a*, the lighting device 100 comprises a cover 120 comprising an at least partially light-transmissive material. According to this example, two light sources 110 of a first set of light sources 140 and two light sources 110 of a second set of light sources 150 are arranged within the cover 120. It will be appreciated, however, that the lighting device 100 may substantially comprise an arbitrary number of light sources 110 of the first and/or second sets of light sources 140, 150. In FIG. 3*a*, each light source 110 of the first set of light sources 140 is arranged within a respective reflector 130, whereas each light source 110 of the second set of light sources 150 is arranged outside the reflectors 130. The light sources 110 of the first and/or second sets of light sources 140, 150 may be LEDs. The light sources 110 are arranged on a single PCB 135, which may be flat or non-flat. In accordance with the lighting device 100 according to the previously described embodiments, the light sources 110 of the first set of light sources 140 which are arranged within the reflectors 130 are configured to emit respective bundles of light from the lighting device 100. Here, the bundles of light emitted from the first set of light sources 140 are predominantly emitted in a plane parallel to the axis, B, e.g. in a horizontal direction and/or plane according to the orientation of the lighting device 100 in the figure. Hence, the first sets of light sources 140 and the reflectors 130 are arranged such that the bundles of light are emitted from the lighting device 100 parallel to the axis, B, i.e. in a peripheral and planar direction of the cover 120 of the lighting device 100. Furthermore, the light sources 110 of the second set of light sources 150 are configured to emit light from the lighting device 100. Here, the light emitted from the second set of light sources 150 is predominantly emitted parallel to the axis, A, i.e. in a vertical direction and/or plane according to the orientation of the lighting device 100 in the figure.

FIG. 3*b* shows a similar lighting device 100 to that shown in FIG. 3*a*, and it is referred to FIG. 3*a* for an increased understanding. In FIG. 3*b*, there are provided four light sources 110 of a first set of light sources 140 and four light sources 110 of a second set of light sources 150 are arranged within the cover 120. It will be appreciated, however, that the lighting device 100 may substantially comprise an arbitrary number of light sources 110 of the first and/or second sets of light sources 140, 150. In FIG. 3*b*, there are provided four reflectors 130, and each light source 110 of the first set of light sources 140 is arranged within a respective reflector 130. Analogously, each light source 110 of the second set of light sources 150 is arranged outside the reflectors 130. One or more bundles of light emitted from the first set of light sources 140 during operation of the lighting device 100 may be emitted in a plane parallel to the axis, B, i.e. in a horizontal direction and/or plane. Furthermore, one or more bundles of light emitted from the first set of light sources 140 during operation of the lighting device 100 may be emitted in a direction/plane which inclined with respect to the axis, B. For example, according to FIG. 3*b*, this direction is obliquely upwards. Moreover, the light sources 110 of the second set of light sources 150 are configured to emit light from the lighting device 100 in an upwards direction and/or plane, parallel to the axis, A, according the exemplifying embodiment of FIG. 3*b*.

Figure 4A:
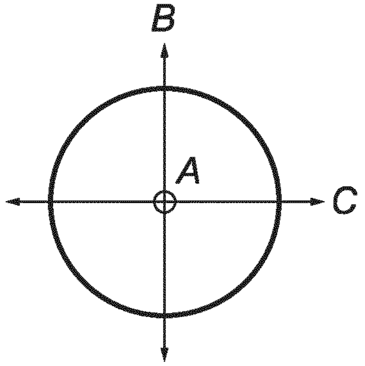
Figure 4B:
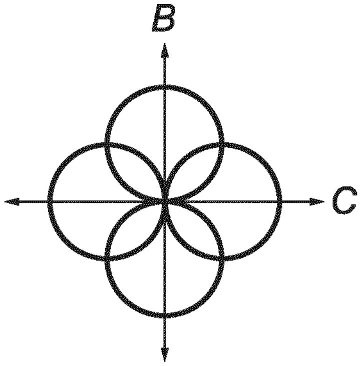
Figure 4C:
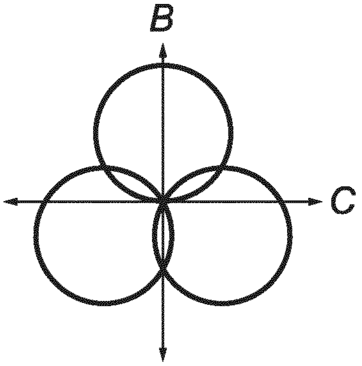

FIGS. 4*a*, 4*b* and 4*c* schematically show light distribution patterns from the lighting device according to an exemplifying embodiment of the present invention. The light distribution patterns are the results (effects) of the operation of the lighting device with one or more reflectors of the plurality of reflectors comprising an at least partially reflective (semi-reflective) layer, such as a diffuser. In FIG. 4*a*, the light distribution pattern is substantially circular in a peripheral and planar direction of the cover of the lighting device. In FIG. 4*b*, the light distribution pattern comprises four circles in the peripheral and planar direction of the cover of the lighting device. Here, there are four regions of overlap of the four bundles of light emitted from the lighting device during operation. In FIG. 4*c*, the light distribution pattern comprises three circles in the peripheral and planar direction of the cover of the lighting device. Here, there are three regions of overlap of the three bundles of light emitted from the lighting device during operation.

Figure 5A:
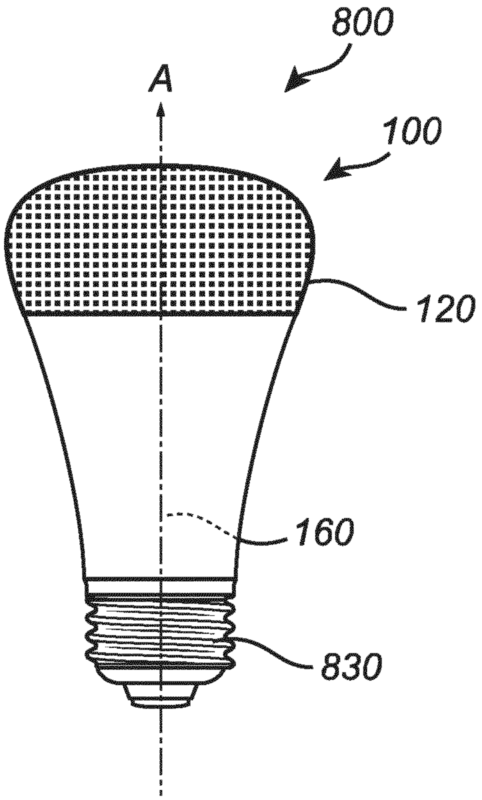
FIGS. 5*a* and 5*b* show lighting arrangements according to exemplifying embodiments of the present invention.
Figure 5B:
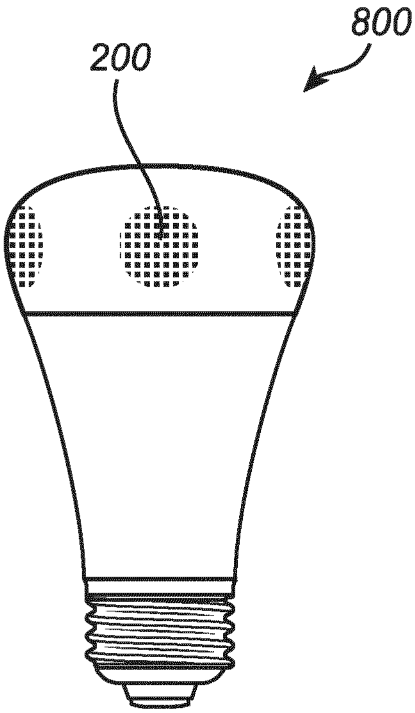

FIGS. 5*a* and 5*b* show operations of a lighting arrangement 800 according to an exemplifying embodiment of the present invention. In FIG. 5*a*, the lighting arrangement 800 elongates along a principal axis, A. The lighting arrangement 800 comprises a lighting device 100 according to any one of the previously described embodiments, i.e. including a cover 120, a plurality of reflectors, a first and second set of light sources (not shown), and a control unit 160 configured to individually control the operation of the first and second sets of light sources. The lighting arrangement 800 further comprises an electrical connection 830 connected to the lighting device 100 for a supply of current to the plurality of light sources of the lighting device 100.

The operation of the lighting arrangement 800 corresponds to that exemplified in FIG. 1*a*, namely that the intensity of the light emitted from the first set of light sources is the same as the intensity of the light emitted from the second set of light sources. Hence, the control unit 160 controls the light sources of the first and second sets of light sources such that the intensity of the light emitted from the lighting arrangement 800 is substantially constant in an omnidirectional direction of the lighting arrangement 800

The cover 120 of the lighting arrangement 800 comprises a plurality of apertures 200, which is visible by FIG. 5*b*. The apertures 200 are respectively arranged at the plurality of reflectors and respective light sources of the first set of light sources, such that each aperture of the plurality of apertures 200 is arranged to transmit (pass) a respective bundle of light from the lighting device 100. In FIG. 5*b*, the operation of the lighting arrangement 800 corresponds to that exemplified in FIG. 1*b*, namely that the control unit 160 controls the light sources of the first and second sets of light sources such that the intensity of the light emitted from the first set of light sources is higher than the intensity of the light emitted from the second set of light sources.

The person skilled in the art realizes that the present invention by no means is limited to the preferred embodiments described above. On the contrary, many modifications and variations are possible within the scope of the appended claims. For example, one or more of the cover 120, the reflector(s) 130, the first and/or second set of light sources 140, 150, etc., may have different shapes, dimensions and/or sizes than those depicted/described.

The invention claimed is:

1. A lighting device, comprising
a plurality of light sources,
a cover comprising an at least partially light-transmissive material and elongating along an axis, A, wherein the cover at least partially encloses the plurality of light sources and defines a mixing chamber for at least a portion of the light emitted from the plurality of light sources during operation, and
a plurality of reflectors arranged within the cover and at respective peripheral portions of the cover,
wherein a first set of light sources of the plurality of light sources is arranged within the plurality of reflectors such that the light sources within each reflector is configured to emit a respective bundle of light from the lighting device, and
wherein a second set of light sources of the plurality of light sources is arranged outside the plurality of reflectors and configured to emit light from the lighting device,
wherein the lighting device further comprises a control unit configured to individually control the operation of the first and second sets of light sources, and
wherein at least two reflectors of the plurality of reflectors are arranged in a plane, B, perpendicular to the axis, A, or wherein at least one reflector of the plurality of reflectors is arranged along the axis, A, and at an end portion of the cover,
wherein the cover is bulb-shaped or elongating along a principal axis, A; and
wherein the cover comprises a plurality of first portions respectively arranged in front of each reflector of the plurality of reflectors, and a second portion of the cover separate from the first portions, wherein at least one property of the plurality of first portions comprises is different from at least one property of the second portion.

2. The lighting device according to claim 1, wherein the control unit is configured to vary the luminous flux of the light emitted from at least one of the first and second set of light sources.

3. The lighting device according to claim 1, wherein the control unit is configured to maintain the total luminous flux of the light emitted from the first and second set of light sources constant as a function of time.

4. The lighting device according to claim 1, fulfilling at least one of
a surface area of the plurality of first portions being at least two times smaller than a surface area of the second portion,
the plurality of first portions having a lower reflectance than the second portion, and
a maximum intensity at the first portions being at least twice as high as a maximum intensity at the second portion of the light emitted from the plurality of light sources during operation.

5. The lighting device according to claim 1, wherein the plurality of reflectors and the first set of light sources are arranged within the lighting device such that the bundles of light emitted from the lighting device during operation have an overlap which is less than 30%.

6. The lighting device according to claim 1, wherein the reflectors of the plurality of reflectors are arranged equidistantly along the periphery of the cover.

7. The lighting device according to claim 1, wherein the number of reflectors is in the range of 2-5.

8. The lighting device according to claim 1, wherein the reflectors of the plurality of reflectors are arranged along the periphery of the cover and are separated by an angle of at least 20° with respect to a center point of the cover.

9. The lighting device according to claim 1, wherein the at least one reflector has a reflectance of >80%.

10. A lighting arrangement elongating along a principal axis, A, the lighting arrangement comprising
a lighting device claim 1, wherein the lighting device is arranged at a first end portion of the lighting arrangement, and
an electrical connection connected to the lighting device for a supply of current to the plurality of light sources, wherein the electrical connection is arranged at a second end portion, opposite the first end portion, of the lighting arrangement.

11. A lighting device, comprising
a plurality of light sources,
a cover comprising an at least partially light-transmissive material and elongating along an axis, A, wherein the cover at least partially encloses the plurality of light sources and defines a mixing chamber for at least a portion of the light emitted from the plurality of light sources during operation, and
a plurality of reflectors arranged within the cover and at respective peripheral portions of the cover, wherein a first set of light sources of the plurality of light sources is arranged within the plurality of reflectors such that the light sources within each reflector is configured to emit a respective bundle of light from the lighting device, and wherein a second set of light sources of the plurality of light sources is arranged outside the plurality of reflectors and configured to emit light from the lighting device, wherein the lighting device further comprises a control unit configured to individually control the operation of the first and second sets of light sources, and wherein at least two reflectors of the plurality of reflectors are arranged in a plane, B, perpendicular to the axis, A, or wherein at least one reflector of the plurality of reflectors is arranged along the axis, A, and at an end portion of the cover, and wherein the cover is bulb-shaped or elongating along a principal axis, and, wherein the cover comprises a plurality of apertures, and wherein each aperture is arranged to let through a respective bundle of light from the lighting device.

12. The lighting device according to claim 11, wherein the plurality of apertures is arranged equidistantly in a circumferential direction of the cover, and wherein the length between pair of apertures is at least 5 mm, more preferably at least 8 mm, and even more preferred at least 10 mm.

13. A lighting device, comprising a plurality of light sources, a cover comprising an at least partially light-transmissive material and elongating along an axis, A, wherein the cover at least partially encloses the plurality of light sources and defines a mixing chamber for at least a portion of the light emitted from the plurality of light sources during operation, and a plurality of reflectors arranged within the cover and at respective peripheral portions of the cover, wherein a first set of light sources of the plurality of light sources are surrounded by the plurality of reflectors such that the light sources is configured to emit a respective bundle of light from the lighting device to a plurality of first portions of the cover, and wherein a second set of light sources of the plurality of light sources is configured to emit light from the lighting device to a plurality of second portions of the cover, wherein the lighting device further comprises a control unit configured to individually control the operation of the first and second sets of light sources, and wherein at least two reflectors of the plurality of reflectors are arranged in a plane, B, perpendicular to the axis, A, or wherein at least one reflector of the plurality of reflectors is arranged along the axis, A, and at an end portion of the cover.

* * * * *